(12) United States Patent
Ishii et al.

(10) Patent No.: US 7,555,192 B2
(45) Date of Patent: Jun. 30, 2009

(54) CONNECTING STRUCTURE OF OPTICAL CONNECTORS

(75) Inventors: Takuji Ishii, Tokyo (JP); Kohshi Ozaki, Tokyo (JP)

(73) Assignee: Sanwa Denki Kogyo Co., Ltd., Tokyo (JP)

( * ) Notice: Subject to any disclaimer, the term of this patent is extended or adjusted under 35 U.S.C. 154(b) by 0 days.

(21) Appl. No.: 11/905,520

(22) Filed: Oct. 2, 2007

(65) Prior Publication Data

US 2008/0112682 A1 May 15, 2008

(30) Foreign Application Priority Data

Nov. 9, 2006 (JP) .............................. 2006-303858

(51) Int. Cl.
*G02B 6/00* (2006.01)
(52) U.S. Cl. .................... 385/137; 385/134; 385/136
(58) Field of Classification Search .................. 385/134, 385/136, 137
See application file for complete search history.

(56) References Cited

FOREIGN PATENT DOCUMENTS

| JP | 2006-47810 A | 2/2006 |
|----|---|---|
| JP | 2006-520021 A | 8/2006 |

*Primary Examiner*—Jennifer Doan
(74) *Attorney, Agent, or Firm*—Bacon & Thomas, PLLC

(57) ABSTRACT

To make a connecting structure of optical connectors capable of constantly and stably keeping optical connector plugs connected in a laterally aligned state through an optical connector clip, the structure includes boots formed to have fitted parts in an annular groove shape or a ringlike projection shape on an outer peripheries thereof; and a clip body including a plurality of boot inserting parts, which are adjacently provided and have fitting parts in a ringlike projection shape or an annular groove shape on an inner peripheries thereof, so as to fit the fitting parts to the fitted parts of the boots, wherein both side faces of the clip body are formed to have slit parts communicating with the boot inserting parts so as to be deformed in an expanding direction.

3 Claims, 5 Drawing Sheets

CONNECTING STRUCTURE OF OPTICAL CONNECTORS

BACKGROUND OF THE INVENTION

1. Field of the Invention

The present invention relates to a connecting structure of optical connectors, which is capable of connecting a plurality of optical connector plugs in a laterally aligned state and using those as a connector plug for a multicore.

2. Description of the Conventional Art

Conventionally, in order to use a code type optical connector, which is made by caulking an aramid fiber "Kevlar" (Trade Mark) and has a code diameter of 2 mm or the like, as a connector for a multicore, e.g. a twin core, an optical connector clip for twin mounting has been used. Further, as for an optical connector core wire not having an aramid fiber "Kevlar", a product itself is reduced in size because of not having the aramid fiber "Kevlar", so that it can be used for only a single core.

Specifically, as illustrated in FIG. 7, the conventional optical connector clip for twin mounting is structured such that a pair of plug bodies 1 including ferrules 2a, ferrule holders 2b, coil springs 2c and the like are mounted within respective frames of a clip body 3 in twin frame type in front of boots 6. A projection plate 4 is obliquely projected from an outer peripheral face of the clip body 3, and each of plug bodies 1 has a latch piece 5. The latch piece 5 is backwardly inclined from the front end so as to be engaged with an opposite connector, which is not illustrated. Further, a top end of each latch piece 5 is engaged with the projection plate 4. The projection plate 4 is pressed toward the clip body 3 so as to be displaced, so that each latch piece 5 is displaced in the direction for closing to the plug body 1.

Further, as for a particular optical connector clip for twin mounting, for example, Japanese Patent Application Laid Open No. 2006-520021 discloses an optical connector assembly having a clip for simultaneously holding a plurality of connectors having a same structure in a laterally aligned state. This connector assembly has connectors, each of which is connected to an externally coated optical cable, and has an approximately rectangular parallelepiped housing which includes an upper face, a lower face, both side faces, a plug end for inserting into an opposite receptacle, and a cable end for housing the optical cable. This housing has recessed parts along each side face, and the clip has a bottom part, first and second end walls extending from the bottom part, and one or more intermediate parts extending from the bottom part between the first and second end walls. Further, each intermediate part has a first face facing the first end wall and a second face facing the second end wall. The first end wall and the first face of one intermediate wall are housed in the recessed part of one connector, and the second end wall and the second face of one intermediate wall are housed in the recessed part of another connector. As a result of this, a plurality of connectors can be arranged and held in the laterally aligned state.

Further, as for another particular optical connector clip for twin mounting, for example, Japanese Patent Application Laid Open No. 2006-47810 discloses an optical connector clip having holding grooves for holding optical connector plugs without annularly surrounding an outer peripheral face of a plug body, and holding two optical connector plugs. As for a clip frame body, the two holding grooves in a cross sectional shape of a rectangular ring with one corner part being cutoff are formed so as to have parallel center axes and to be adjacent to each other. Therefore, the optical connector clip can hold two optical connector plugs in parallel, and can insert and remove those simultaneously.

SUMMARY OF THE INVENTION

According to the conventional constitution, the optical connector assembly disclosed in Japanese Patent Application Laid Open No. 2006-520021 has a constitution, in which the first end wall and the first face of one intermediate wall of the clip are housed in the recessed part formed along the side face of the housing. On the other hand, the optical connector clip disclosed in Japanese Patent Application Laid Open No. 2006-47810 has a constitution, in which the clip frame body has the holding grooves for holding the optical connector plugs without annularly surrounding the outer peripheral face of the plug body. The both conventional clips are fixed by one to four places in the housing or the plug body. So, when excessive pulling force is applied from the external to the boot side so as to separate the housings or the plug bodies which are connected through the clip, the housings or the plug bodies may be easily detached from the sides of the clip.

Then, the present invention is to solve the above-described conventional problems, and an objective of the present invention is to provide a connecting structure of optical connectors, which is capable of constantly keeping a stable holding state, with the constitution such that each optical connector plug is not detached from an optical connector clip, even when excessive pulling force is applied from the external so as to separate optical connector plugs connected through an optical connector clip.

In order to realize the above-described objective, the present invention has the following aspect. A connecting structure of optical connectors which is capable of connecting a plurality of optical connector plugs in a laterally aligned state and using those as a connector plug for a multicore includes boots formed to have a fitted part in an annular groove shape or a ringlike projection shape on each of outer peripheries thereof; and a clip body including a plurality of boot inserting parts which are adjacently provided and have a fitting part in a ringlike projection shape or an annular groove shape on each of inner peripheries thereof so as to fit the fitting parts to the fitted parts of the boots.

Further, both side faces of the clip body are formed to have slit parts communicating with the boot inserting parts so as to be deformed in an expanding direction.

The clip body includes fixing plates on an upper face thereof so as to prevent the mutual movement between the clip body and extender caps (stop rings).

Further, the clip body includes locking parts so as to prevent the mutual movement between the fitted parts of the boots and the fitting parts of the boot inserting parts.

The clip body is formed of an elastic material. A projecting plate is obliquely projected from an outside face over a plurality of the boot inserting parts. Latch pieces, each of which is obliquely and backwardly provided from a front end of each plug body so as to be engaged with an opposite connector, are engaged with the projecting plate. By pressing the projecting plate toward the clip body side, each latch piece is displaced in the direction for closing to the plug body.

According to the present invention, even when excessive pulling force is applied to optical connector plugs connected through an optical connector clip so as to separate those, each optical connector plug is not detached from the optical connector clip. Thus, the optical connector plugs can be constantly kept in a stable state.

That is, since the present invention includes boots formed to have a fitted part in an annular groove shape or a ring projection shape on each of outer peripheries thereof; and a clip body including a plurality of boot inserting parts which are adjacently provided and have a fitting part in a ringlike projection shape or an annular groove shape on each of inner peripheries thereof, so as to fit the fitting parts to the fitted parts of the boots, thus, each plug body can be constantly kept in a stable state by fitting and connecting of the respective boots through the clip body. Especially, as for an optical connector core wire not having an aramid fiber "Kevlar", a product itself is reduced in size, so that it can be used for only a single core. However, the product not having an aramid fiber "Kevlar" can be used for a multicore by the present invention.

Further, since the both side faces of the clip body have the slit parts communicating with the boot inserting parts so as to be deformed in the expanding direction, when the boots are inserted into the boot inserting parts, the fitting parts can be smoothly fitted with the fitted parts, and the plug body can be easily attached to and detached from the clip body.

Further, since the clip body includes the fixing plates on the upper face thereof so as to prevent the mutual movement between the clip body and the extender caps (the stop rings), the unneeded movements (including rotation) of the extender caps (the stop rings) provided in the boot inserting parts of the clip body and the boots can be prevented.

Furthermore, since the clip body includes the locking parts so as to prevent the mutual movement between the fitted parts of the boots and the fitting parts of the boot inserting parts, the unneeded movement (including rotation) of the boots provided in the boot inserting parts of the clip body can be prevented.

Since the clip body is formed of the elastic material, the projecting plate is obliquely projected from the outside face over a plurality of the boot inserting parts, the latch pieces, each of which are obliquely and backwardly provided from the front end of each plug body so as to be engaged with an opposite connector, are engaged with the projecting plate, and each latch piece is displaced in the direction for closing to the plug body by pressing the projecting plate toward the clip body side, thus, when a user presses the pressing face by a finger so as to release the engagement between the latch pieces and the opposite connector and remove the optical connector plugs from the opposite connector, the user can simultaneously remove the plug bodies while keeping the multiple plugs in parallel.

BRIEF EXPLANATION OF DRAWINGS

FIG. 4(a) is a front view, FIG. 4(b) is a side view, FIG. 4(c) is a rear view, FIG. 4(d) is a cross sectional view taken along the line A-A in FIG. 4(b), and FIG. 4(e) is a cross sectional view taken along the line B-B in FIG. 4(c).

FIG. 5(a) is a side view, and FIG. 5(b) is a cross sectional view taken along the line C-C in FIG. 5(a).

FIG. 6(a) is a cross sectional view of a right triangle shaped locking part, FIG. 6(b) is a cross sectional view of a circular locking part, and FIG. 6(c) is a cross sectional view of an angular locking part.

DETAILED DESCRIPTION OF PREFERRED EMBODIMENT

Hereinafter, the preferred embodiment of the present invention will be described with drawings.

In addition, a connecting structure of optical connectors according to the present invention can be used for various connector systems, for example, including KC type, MU type, ST type, FC type, SC type, MPX type, MPO type and the like. However, this structure can be most preferably applied for a single core fiber connector of a small form factor, such as a LC type connector, a MU type connector or the like.

Figure 1:
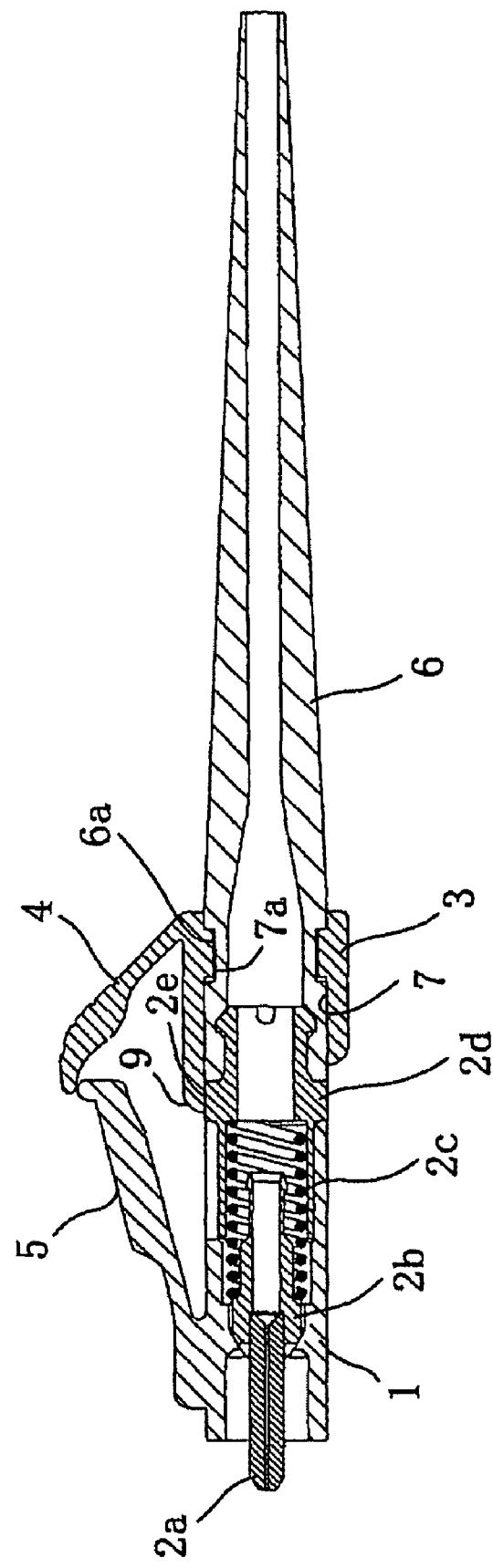
FIG. 1 is a cross sectional view for illustrating one example of a connecting structure of optical connectors according to the preferred embodiment of the present invention.
Figure 2:
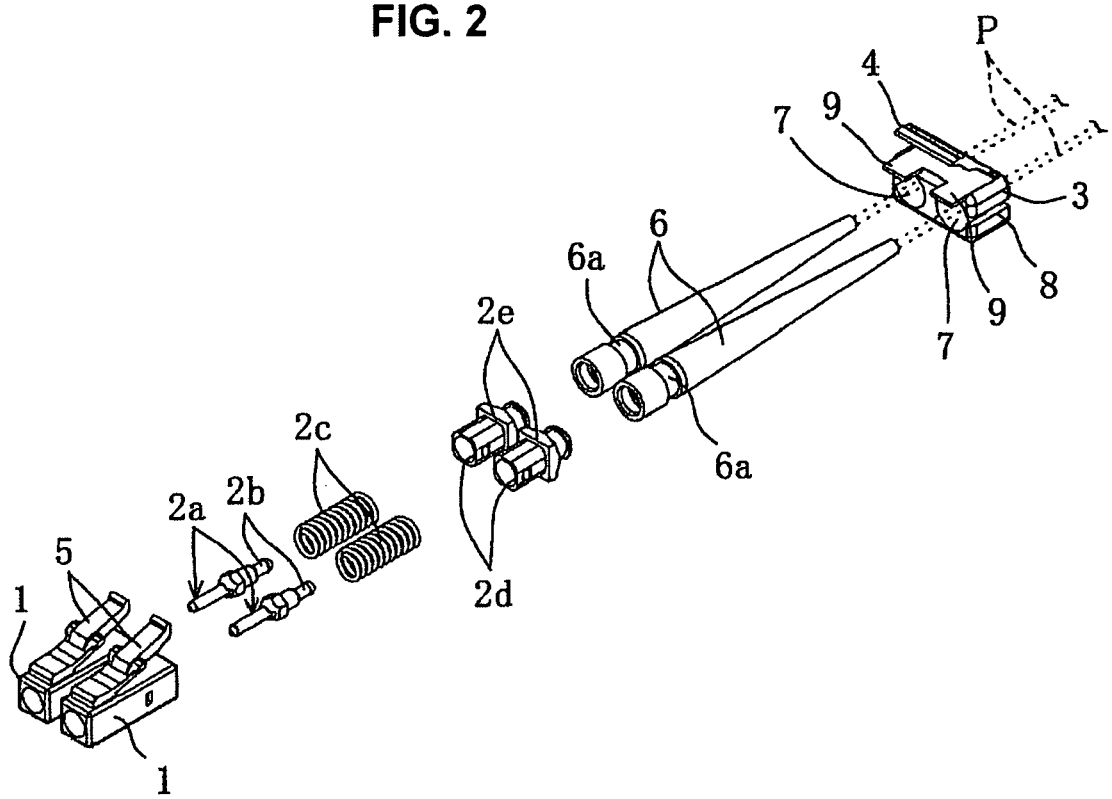
FIG. 2 is an exploded perspective view for illustrating an assembling process of the optical connector connecting structure.

A plug body 1 includes a ferrule 2a, a ferrule holder 2b and a coil spring 2c, as illustrated in FIGS. 1 and 2. A boot 6 is connected to the plug body 1 at the rear side thereof through an extender cap (a stop ring) 2d.

Figure 5A:
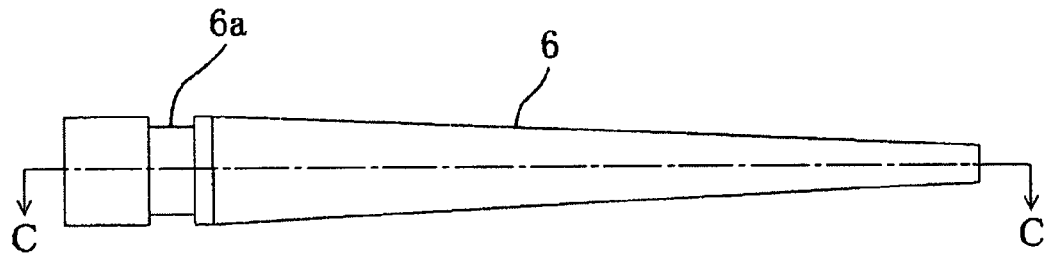
FIGS. 5(a) and 5(b) are views for illustrating an example of a fitted part of a boot, where
Figure 5B:
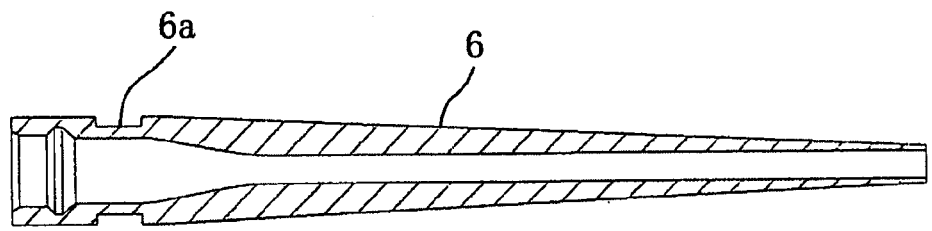

As illustrated in FIG. 1, the connecting structure of optical connectors includes the tapered cylindrical boots 6, each of which has a fitted part 6a on an outer periphery near the one end opening side, and a clip body 3 having a rectangular frame shape, in which a pair of boot inserting parts 7 are provided in parallel. Each of the boot inserting parts 7 has a fitting part 7a on an inner periphery so as to be fitted to the fitted part 6a. Further, the fitted part 6a of the boot 6 is formed to have an annular groove as illustrated in FIGS. 5(a) and 5(b), and the fitting part 7a on the inner periphery of the boot inserting part 7 of the clip body 3 is formed to have a ringlike projection shape as illustrated in FIGS. 4(a) to 4(e) corresponding to the shape of the fitted part 6a.

In addition, the shape of the fitted part 6a of the boot 6 can be a ringlike projection shape, and the shape of the fitting part 7a on the inner periphery of the boot inserting part 7 of the clip body 3 can be an annular groove corresponding to the shape of the fitted part 6a.

Further, as illustrated in FIGS. 4(a) to 4(e), the both side faces of the clip body 3 have slit parts 8 communicating with the boot inserting parts 7. Thus, when the boot 6 is inserted, the boot inserting part 7 can be deformed in the expanding direction through the slip parts 8. Further, the slit parts 8 are used for inserting both optical cables (illustrated in FIGS. 2 and 3) into the respective boot inserting parts 7 at the time of mounting the plug bodies 1 to the clip body 3.

Further, both upper faces of the boot inserting parts 7 of the clip body 3 have fixing plates 9 formed by horizontally extending respective front end sides thereof. When the connecting structure of optical connectors is assembled, the fixing plates 9 are contacted with horizontal upper faces 2e of angular flanges of the extender caps (the stop rings) 2d. Thereby, the mutual movements (including rotation) of the clip body 3 to the extender caps (the stop rings) 2d and the boots 6 are prevented.

Further, the clip body 3 is formed of an elastic material. A projecting plate 4 is obliquely projected from the outside face over a pair of the boot inserting parts 7. Latch pieces 5 are obliquely and backwardly provided from respective front ends of the plug bodies 1 so as to be engaged with an opposite connector being not illustrated, and a top end of each latch piece 5 is connected with a top end of the projecting plate 4. Further, the projecting plate 4 displaces each latch piece 5 in the direction for closing to the plug body 1 by being pressed toward the clip body 3 by a finger or the like.

Figure 3:
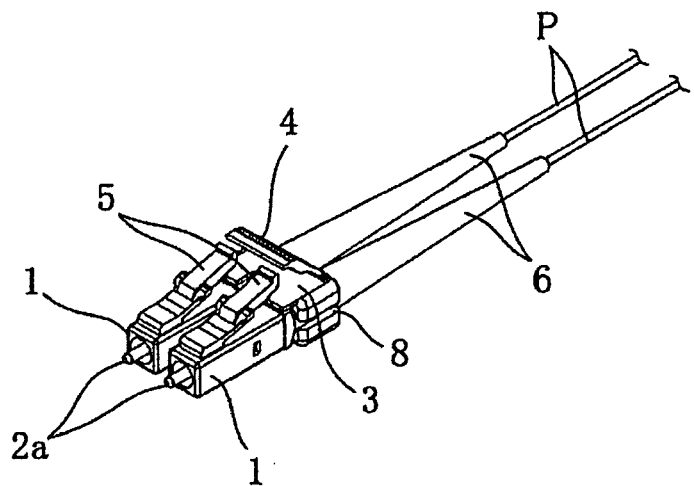
FIG. 3 is a perspective view for illustrating an assembling state of the connecting structure of optical connectors.
Figure 4A:
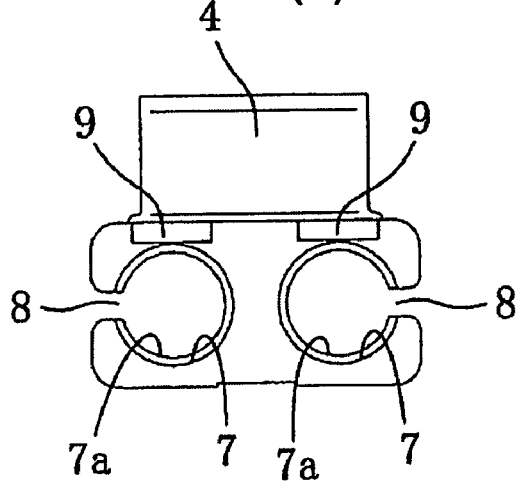
FIGS. 4(a) to 4(e) are views for illustrating a constitution of a clip body, where
Figure 4B:
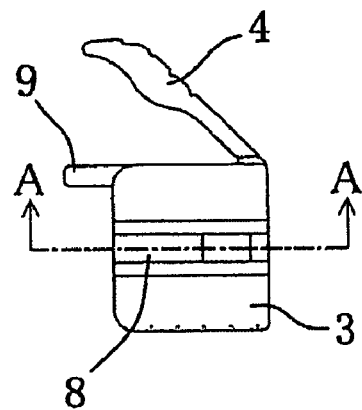
Figure 4C:
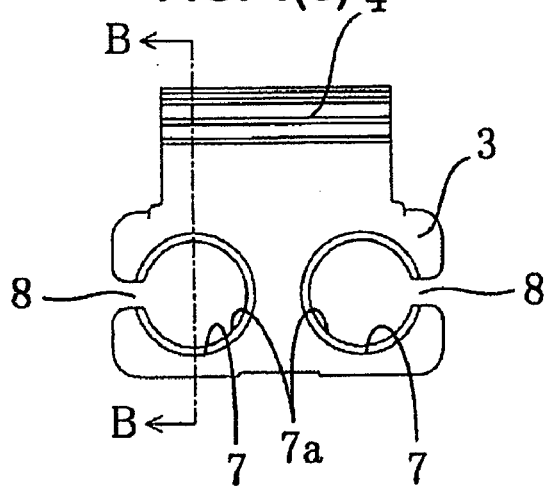
Figure 4D:
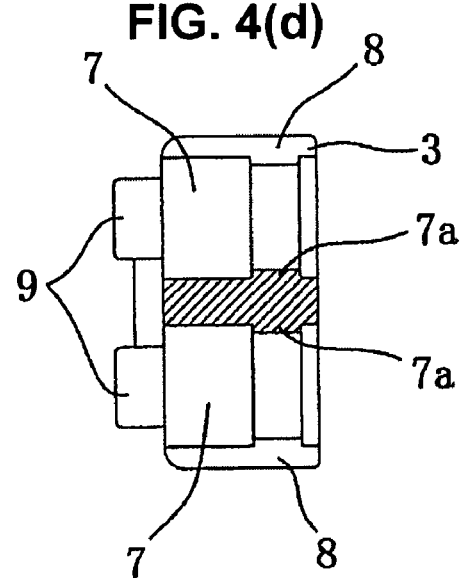
Figure 4E:
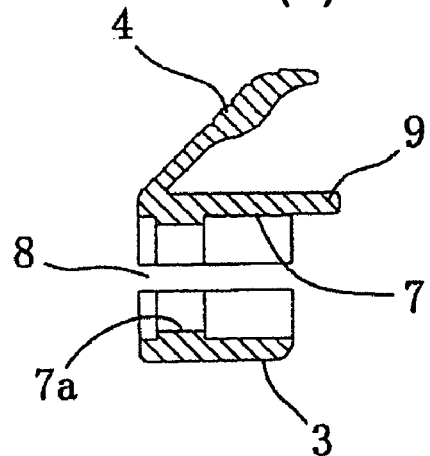

As illustrated in FIG. 2, when a pair of the plug bodies 1 is assembled to the clip body 3, a pair of the boots 6 is inserted into both inserting parts 7 of the clip body 3 from the tapered and contracted diameter side, and the fitting parts 7a on the inner peripheries of the boot inserting parts 7 are fitted to the fitted parts 6a of the boots 6. Thus, as illustrated in FIG. 3, a pair of the boots 6 are fixedly held to the clip body 3 together with the plug bodies 1 in the parallel twin state.

Figure 6A:
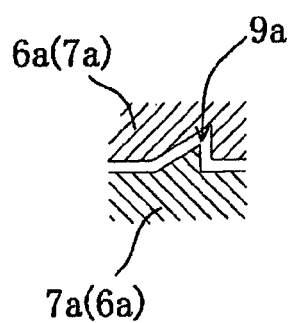
FIGS. 6(a) to 6(c) are views for illustrating an example of the fitting state of a fitting part of a boot inserting part to a fitted part of a boot, where
Figure 6B:
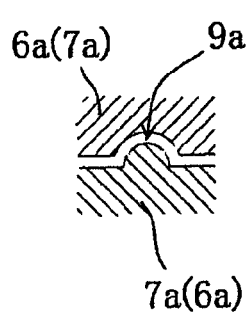
Figure 6C:
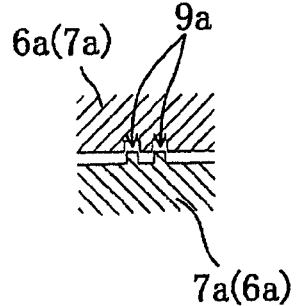
Figure 7:
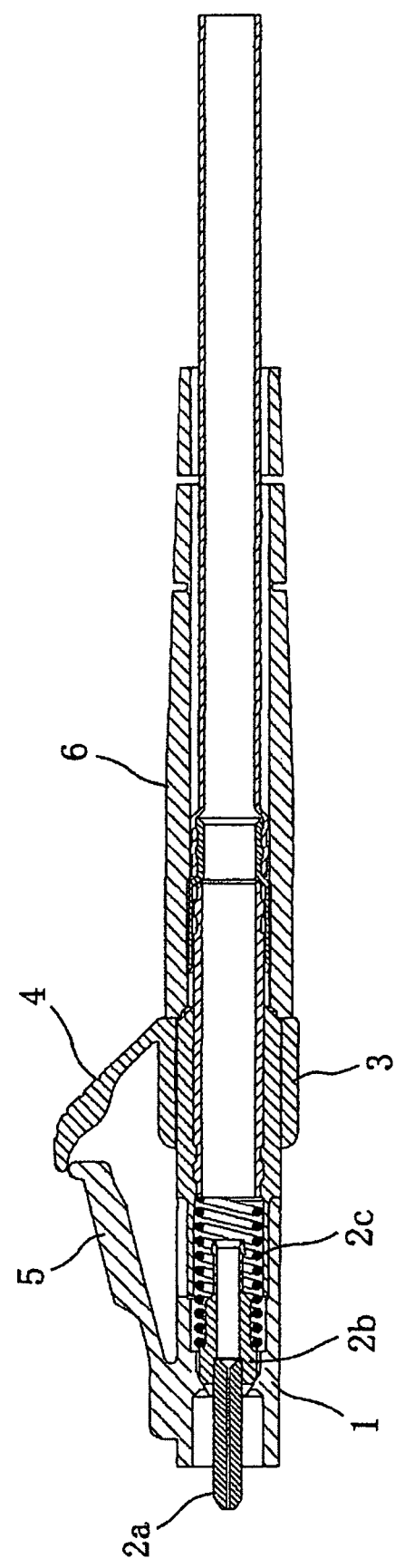
FIG. 7 is a cross sectional view for illustrating the state that an optical connector clip is used, in a conventional example.

In this embodiment, since the shape of the boot inserting part 7 of the clip body 3 is a circular hole corresponding to the cylindrical boot 6, the fixing plate 9 is provided at the clip body 3. However, as illustrated in FIGS. 6(a) to 6(c), one or plural locking parts 9a may be formed at both of the fitted parts 6a of the boots 6 and the fitting parts 7a of the boot inserting parts 7 of the clip body 3. The shape of the locking part 9a may be a right triangle shape (refer to FIG. 6 (a)), a semicircular shape (refer to FIG. 6(b)), an angular shape (refer to FIG. 6(c)) or the like. For example, the locking part 9a can be formed by forming a projection having the any of above-described shapes (or a recessed groove) on the surface of the fitted part 6a of the boot 6, and forming a recessed groove (or a projection) on the surface of the fitting part 7a of the boot inserting part 7 corresponding to the projection (or the recessed groove) of the fitted part 6a. Thus, the locking part 9a has a function to prevent the movement (including rotation) of the boot 6 to the clip body 3.

Further, the boot 6 can have an angular cylindrical shape, and the boot inserting part 7 of the clip body 3 can have an angular shape corresponding to the shape of the boot 6. In this case, the fixing plate 9 of the clip body 3 and the locking part 9a can be omitted. In addition, while the description is made for the embodiment of the connecting structure of optical connectors in which a pair of the optical connector plugs are connected in the laterally aligned state so as to use it as a connector plug for twin cores, however, this structure can be used as a connector for a multicore of three or more cores.

Then, an example of using and assembling of the structure (twin type) according to the preferred embodiment having the above-described constitution will be described. As illustrated in FIG. 2, the optical cable P is inserted into the boot 6 and the extender cap (the stop ring) 2d, and a core wire, which is an uncoated tip end of the optical cable P, is adhered fixedly in a fiber hole provided at the center of the ferrule 2a through the ferrule holder 2b. Then, the ferrule 2a and the coil spring 2c are inserted into the plug body 1, and the extender cap (the stop ring) 2d is fixed to the plug body 1. After that, the boot 6 is fixed to the extender cap (the stop ring) 2d.

Two sets of the plug bodies 1 formed by the above-described process are prepared, and are connected in the parallel twin state by the clip body 3. At this time, the optical cables P are inserted into the boot inserting parts 7 through the slit parts 8 of the clip body 3, and are backwardly moved while keeping this state, so that the boots 6 are inserted into the boot inserting parts 7 of the clip body 3 from the tapered and contracted diameter side thereof.

Further, the boots 6 are forcedly pushed into the boot inserting parts 7, so as to fit the fitted parts 6a of the boots 6 to the fitting parts 7a on the inner peripheries of the boot inserting parts 7. At this time, the boots 6 are pushed in while the boot inserting parts 7 are deformed in the expanding direction through the slit parts 8. When the fitted parts 6a of the boots 6 are fitted to the fitting parts 7a, the boot inserting parts 7 are returned in the contracting direction through the slit parts 8, and the periphery faces of the boots 6 are strongly held by the inner periphery faces of the boot inserting parts 7.

Accordingly, the top ends of respective latch pieces 5 of the both plug bodies 1 are engaged with the top end of the projecting plate 4 of the clip body 3. Therefore, as illustrated in FIG. 3, a pair of the boots 6 are held fixedly to the clip body 3 together with the plug bodies 1 in the parallel twin state.

Further, when the plug bodies 1 are detached from the clip body 3, the clip body 3 is forcedly moved toward rear side of the boots 6 along the optical cables P, so as to detach the fitted parts 6a of the boots 6 from the fitting parts 7a on the inner peripheries of the boot inserting parts 7 while the boot inserting parts 7 is deformed in the expanding direction through the slit parts 8. Then, the optical cables P are removed through the slit parts 8. Thereby so as to the plug bodies 1 are easily detached from the clip body 3.

What is claimed is:

1. A connecting structure of optical connectors which is capable of connecting a plurality of optical connector plugs in a laterally aligned state and using those as a connector plug for a multicore, the structure comprising:

boots formed to have fitted parts in an annular groove shape or a ringlike projection shape on each of outer peripheries thereof; and a clip body including a plurality of boot inserting parts which are adjacently provided and have fitting parts in a ringlike projection shape or an annular groove shape on each of inner peripheries thereof so as to fit the fitting parts to the fitted parts of the boots;

wherein the clip body includes locking parts so as to prevent the mutual movement between the fitted parts of the boots and the fitting parts of the boot inserting parts.

2. The connecting structure of optical connectors as claimed in claim 1, wherein the clip body includes fixing plates on an upper face thereof so as to prevent the mutual movement between the clip body and extender caps (stop rings).

3. The connecting structure of optical connectors as claimed in claim 1, wherein the clip body is formed of an elastic material, and a projecting plate is obliquely projected from an outside face over a plurality of the boot inserting parts; and latch pieces, each of which is obliquely and backwardly provided from a front end of each plug body so as to be engaged with an opposite connector are respectively engaged with the projecting plate, wherein each latch piece is displaced in the direction for closing to the plug body by pressing the projecting plate toward the clip body side.

* * * * *